United States Patent
Al-Maaitah et al.

(10) Patent No.: US 8,479,529 B2
(45) Date of Patent: Jul. 9, 2013

(54) TWO-STAGE LOW TEMPERATURE AIR COOLED ADSORPTION COOLING UNIT

(75) Inventors: Ayman Adnan Salim Al-Maaitah, Amman (JO); Adnan Ayman Al-Maaitah, Amman (JO)

(73) Assignee: Millennium Energy Industries, Incorporated, George Town, Grand Cayman, KY (US)

( * ) Notice: Subject to any disclaimer, the term of this patent is extended or adjusted under 35 U.S.C. 154(b) by 476 days.

(21) Appl. No.: 12/672,646

(22) PCT Filed: Aug. 7, 2008

(86) PCT No.: PCT/IB2008/002077
§ 371 (c)(1),
(2), (4) Date: Jan. 20, 2011

(87) PCT Pub. No.: WO2009/019583
PCT Pub. Date: Feb. 12, 2009

(65) Prior Publication Data
US 2011/0113796 A1    May 19, 2011

(30) Foreign Application Priority Data
Aug. 9, 2007 (EP) .................................. 07114127

(51) Int. Cl.
*F25B 15/00* (2006.01)
(52) U.S. Cl.
USPC .......................................... 62/101; 62/238.3
(58) Field of Classification Search
USPC ............. 62/101, 238.3, 235.1, 430, 513, 476, 62/478, 481
See application file for complete search history.

(56) References Cited

U.S. PATENT DOCUMENTS 4,199,959 A  4/1980 Wurm
4,219,341 A  8/1980 Hussmann (Continued)

FOREIGN PATENT DOCUMENTS

CN    1266168    9/2000
JP    4291751    10/1992

(Continued)

OTHER PUBLICATIONS

Saha, B.B. et al., "Solar/waste Heat Driven Two-Stage Adsorption Chiller: the Prototype", Renewable Energy. vol. 23, 2001, pp. 93-101.

(Continued)

*Primary Examiner* — Mohammad M Ali
(74) *Attorney, Agent, or Firm* — Faegre Baker Daniels LLP

(57) ABSTRACT

A heat-driven adsorption cooling unit, comprising: —a condenser having an input end and an output end; —an evaporator having an input end and an output end, the input end being connected to the output end of the condenser via an operable valve; and —a series of sorption-desorption generators, each of which has input and an output ends for connection to the condenser and evaporator to create a refrigerant flow circuit, and a heat supply for operating each generator at high and low temperatures, the generators being operable to flow refrigerant through the condenser and evaporator to provide a cooling effect at the evaporator; wherein the series of generators comprises two pairs of generators, each pair comprising: —a first generator having an output end connected to the input end of the condenser via a first non-return valve arranged to prevent flow from the condenser to the first generator; and —a second generator having an input end connected to the output end of the evaporator via a second non-return valve arranged to prevent flow from the second generator to the evaporator, and an output end connected to the input end of the first generator via a third non-return valve arranged to prevent flow from the input end of the first generator to the output end of the second generator; each pair of generators being separately operable to drive fluid through the condenser and evaporator to provide a cooling effect.

19 Claims, 5 Drawing Sheets

U.S. PATENT DOCUMENTS

| | | | |
|---|---|---|---|
| 4,222,244 A * | 9/1980 | Meckler | 62/235.1 |
| 4,337,625 A * | 7/1982 | Wilkinson | 62/79 |
| 4,424,688 A * | 1/1984 | Wilkinson | 62/476 |
| 4,441,332 A * | 4/1984 | Wilkinson | 62/238.3 |
| 4,531,374 A * | 7/1985 | Alefeld | 62/79 |
| 4,542,629 A * | 9/1985 | Biermann | 62/476 |
| 4,594,856 A * | 6/1986 | Rothmeyer | 62/112 |
| 4,754,805 A * | 7/1988 | Rothmeyer | 165/104.12 |
| 4,902,207 A * | 2/1990 | Hembree et al. | 417/403 |
| 4,955,205 A * | 9/1990 | Wilkinson | 62/94 |
| 5,024,063 A * | 6/1991 | Erickson | 62/101 |
| 5,070,702 A | 12/1991 | Jackson | |
| 5,070,703 A * | 12/1991 | Wilkinson | 62/94 |
| 5,077,986 A * | 1/1992 | Cook et al. | 62/483 |
| 5,097,676 A * | 3/1992 | Erickson | 62/476 |
| 5,251,458 A * | 10/1993 | Tchernev | 62/271 |
| 5,463,879 A | 11/1995 | Jones | |
| 5,477,706 A | 12/1995 | Kirol et al. | |
| 5,529,709 A * | 6/1996 | Rockenfeller | 252/69 |
| 5,572,884 A * | 11/1996 | Christensen et al. | 62/476 |
| 5,619,866 A | 4/1997 | Sato et al. | |
| 5,729,988 A * | 3/1998 | Tchernev | 62/106 |
| 5,758,509 A | 6/1998 | Maeda | |
| 5,806,323 A | 9/1998 | Bevier | |
| RE36,684 E * | 5/2000 | Rockenfeller et al. | 62/324.2 |
| 6,128,917 A * | 10/2000 | Riesch et al. | 62/476 |
| 6,170,279 B1 | 1/2001 | Li | |
| 6,474,099 B2 * | 11/2002 | Tanaka et al. | 62/480 |
| 6,490,875 B2 | 12/2002 | Chua et al. | |
| 6,539,738 B2 * | 4/2003 | Gonzalez-Cruz et al. | 62/235.1 |
| 6,715,290 B1 * | 4/2004 | Erickson | 60/671 |
| 6,802,364 B1 * | 10/2004 | Garimella | 165/116 |
| 7,003,966 B2 * | 2/2006 | Sharma et al. | 62/101 |
| 7,003,979 B1 * | 2/2006 | Davidson | 62/497 |
| 7,082,781 B2 | 8/2006 | Kikuchi et al. | |
| 2005/0103615 A1 | 5/2005 | Ritchey | |

FOREIGN PATENT DOCUMENTS

| | | |
|---|---|---|
| JP | 2002/250573 | 9/2002 |
| JP | 2005/172380 | 6/2005 |
| WO | WO 93/05349 | 3/1993 |
| WO | WO 03/046449 | 6/2003 |
| WO | WO 2004/094948 | 11/2004 |

OTHER PUBLICATIONS

Saha, BB. et al., "Study on ACF/Ethanol Based Two Stage Adsorption Coolilng Cycle", published in Renewable Energy, vol. 23, 2001, pp. 90-101.

International Search Report and Written Opinion issued in PCT/IB2008/002077, mailed Jan. 23, 2009, 5 pages.

European Search Report issued in European Application No. 07114127, mailed Jan. 16, 2008, 4 pages.

* cited by examiner

TWO-STAGE LOW TEMPERATURE AIR COOLED ADSORPTION COOLING UNIT

CROSS-REFERENCE TO RELATED APPLICATIONS

The present application is a national phase application of PCT/IB2008/002077, filed pursuant to 35 U.S.C. §371, which claims priority to EP 07114127.9, filed Aug. 9, 2007. Both applications are incorporated herein by reference in their entirety.

TECHNICAL FIELD

The present invention relates to a cooling unit that is applicable to a low grade heat driven adsorption chiller using a cycle which allows the usage of ambient low temperature water and relatively low temperature 'hot' water to create a cooling effect at relatively high efficiency when compared with previous cycles.

BACKGROUND ART

The principle of generating a cooling effect using heat is well-known and the traditional absorption cycle is based on this principle. However, due to the many problems associated with the traditional absorption cycles attention is shifting towards adsorption. Adsorption does not require a liquid solution to operate in the cycle which simplifies it drastically and recent advancements in electronic control mechanisms make it easier to run with steady operation even with a variable heating supply.

Previously proposed uses of adsorption in air conditioning and cooling have various forms. Examples can be found in U.S. Pat. Nos. 5,806,323, 7,082,781, 4,219,341, 5,806,323, US20050103615 A1, JP2002250573, JP4291751, WO03046449, WO2004/094948 A1, CN1266168, and U.S. Pat. No. 6,170,279.

The techniques described in U.S. Pat. Nos. 5,806,323, 7,082,781, 4,219,341, JP4291751, and U.S. Pat. No. 5,806,323 are based on the principle of de-humidification of air (desiccant effect) which allows the removal of humidity from air such that evaporative cooling can be subsequently performed. Although the removal of humidity from air is an adsorption principle, it has certain problems. The desiccant effect works for humid air and cannot generate chilled water. It is not considered as an active process of cooling since evaporative cooling is needed to lower the temperature of the air in air conditioning and it cannot be used for industrial applications. Even for residential air conditioning it has two main disadvantages; the first is its inability to work in dry areas, while the second is the need to add humidity to lower the temperature of air which can become uncomfortable and water consuming.

Active adsorption machines based on silica gel and single stage operation are available in the market. These machines use water as a refrigerant and the silica gel has the ability to adsorb water vapour to generate chilled water. However, such machines suffer from the need to be air-cooled and because water at the required level of vacuum cannot be condensed at 35° C. or 40° C. ambient air temperatures, a cooling tower is needed to create a cooling water temperature below atmospheric. Such machines are also bulky in size due to the low adsorption capacity of the silica gel and consequently are expensive. WO2004/094928 discloses a modification of the silica gel adsorption chiller that operates at good efficiency and a relatively 'low' hot water temperature. However, the machine is still water cooled since it needs cooling temperature below 30° C. It uses a rotating core to eliminate the interchanging mechanism usually used in adsorption machines.

JP2002250573 describes a solar assisted cooling/heating device in which a solar powered adsorption chiller is used to lower the temperature of the traditional compressor based chiller in summer and provide heat for the reverse cycle heat pump in winter, thus increasing the traditional chiller efficiency. Since the adsorption chiller does need to provide low temperature and only needs to reduce the condenser temperature below atmospheric, a silica gel adsorption chiller that operates at relatively high pressure which does not need low temperature of cooling water can be used and hence no cooling tower is needed. However, that device cannot generate cooling effect by itself and it needs to be connected to a regular vapour compression refrigeration cycle to generate any required cooling.

To avoid the need for a cooling tower, a different sorbent-refrigerant pair than water-silica gel can be selected. Hence, the refrigerant can be condensed at higher temperatures than that needed in the silica gel adsorption chiller and the need for the cooling tower is eliminated. By using the same single stage cycle of the silica gel adsorption chillers, the techniques described in US20050103615, WO03046449, CN1266168, and U.S. Pat. No. 6,170,279 use adsorbents such as activated carbon, zeolite, and calcium chloride. The refrigerants utilized are ammonia and methanol. Although, these techniques use various techniques for utilising different heat sources and methods to transfer the heat, they all basically use the same cycle of operation based on a singe stage compression of the refrigerant gases in the de-sorption process. The main draw back of such cycle is that all of the adsorption of refrigerant from the adsorbent material occurs at low pressure while all of the de-sorption occurs at high pressure. Either a high temperature is needed for the de-sorption process or only low level of efficiency can be achieved. US20050103615 and WO03046449 describe systems which use concentrated solar collectors to achieve temperatures around 130° C. to get an intermediate efficiency (COP of 0.2-0.4) even for intermittent cycle (day-night cycle). U.S. Pat. No. 6,170,279 describes a system that uses the temperature of the exhaust gases from a boat engine to achieve a similar level of efficiency. By using solar energy without a concentrator the system described in CN1266168 achieves very low level of efficiency (COP 0.05-0.1).

The techniques described above suffer from the problem that they either cannot operate at ambient temperatures or operate only at low levels of efficiency. The present invention aims to overcome these problems by using a two stage compression and de-sorption process such that most of the adsorption occurs at high pressure while most of the de-sorption occurs at lower pressure. As a result the more refrigerant is adsorbed and de-sorbed at the same temperature which allows the use of a relatively low temperature source of energy whilst obtaining relatively high efficiency as compared to the existing systems. Furthermore, the present invention allows the utilization of a number of adsorbent-refrigerant pairs such that an air cooled chiller can be constructed.

DISCLOSURE OF THE INVENTION

One aspect of this invention provides a heat-driven adsorption cooling unit, comprising:
- a condenser having an input end and an output end;
- an evaporator having an input end and an output end, the input end being connected to the output end of the condenser via an operable valve; and
- a series of sorption-desorption generators, each of which has input and an output ends for connection to the condenser and evaporator to create a refrigerant flow circuit, and a heat supply for operating each generator at high and low temperatures, the generators being operable to flow refrigerant through the condenser and evaporator to provide a cooling effect at the evaporator;

wherein
the series of generators comprises two pairs of generators, each pair comprising:
- a first generator having an output end connected to the input end of the condenser via a first non-return valve arranged to prevent flow from the condenser to the first generator; and
- a second generator having an input end connected to the output end of the evaporator via a second non-return valve arranged to prevent flow from the second generator to the evaporator, and an output end connected to the input end of the first generator via a third non-return valve arranged to prevent flow from the input end of the first generator to the output end of the second generator;

each pair of generators being separately operable to drive fluid through the condenser and evaporator to provide a cooling effect.

Preferably, the heat supply comprises a supply of heat transfer fluid to the generators to control the temperature of the generators.

It is particularly preferred that the heat supply comprises a solar heater for heating the heat transfer fluid to a high temperature. The solar heater typically comprises an evacuated tube solar collector. An accumulator for storing hot heat transfer fluid prior to supply to the generators may also be provided.

The heat supply also typically comprises a radiator (cooled by air at ambient temperature, for example) for cooling the heat transfer fluid to a low temperature.

The unit may also comprise pumps for circulating hot or cold heat transfer fluid to the generators.

The heat transfer fluid preferably comprises water.

Another aspect of the invention comprises a method of operating a cooling unit as defined above, comprising:
operating the valve and the heat supplies to the generators of each pair so as to cycle the temperature in each generator between hot and cold such that refrigerant is driven around the circuit through the condenser and evaporator, the first generator cycling between super-charged, empty and charged states and the second generator correspondingly cycling between sub-empty, charged and empty states.

Prior to temperature cycling, the method may include performing a start-up procedure comprising:
i) filling the generators, condenser and evaporator with refrigerant at a substantially constant pressure, the generators being held at a low temperature;
ii) operating the valve to prevent refrigerant flow from the condenser to the evaporator;
iii) heating the second generators of each pair to drive refrigerant into the first generators of each pair such that the first generators become charged and the second generators become empty;
iv) cooling the second generators to draw refrigerant from the evaporator to at least partly charge the second generators; and
v) heating one of the second generators to further increase the charge of refrigerant in the first generator to which it is connected.

A first step of the method preferably comprises:
cooling the empty second generator of a first pair to bring it to a sub-empty state;
heating the associated first generator of the first pair to bring it to a super-charged state; and
allowing refrigerant to pass from the first generator through the condenser and evaporator to the second generator so as to cause a cooling effect at the evaporator.

Typically, the first step comprises discharging the first generator to an empty state and charging the second generator to a charged state.

A second step preferably comprises:
heating the charged second generator of a second pair to discharge refrigerant to the corresponding first generator and bring the second generator to an empty state; and
cooling the associated first generator of the second pair to bring it to a charged state.

A third step preferably comprises:
cooling the empty second generator of the second pair to bring it to a sub-empty state;
heating the corresponding charged first generator to bring it to a supercharged state; and
allowing refrigerant to pass from the first generator of the second pair through the condenser and evaporator to the second generator of the second pair so as to cause a cooling effect at the evaporator.

Typically, the third step comprises discharging the first generator to an empty state and charging the second generator to a charged state.

A fourth step preferably comprises:
heating the charged second generator of the first pair to discharge refrigerant to the corresponding first generator and bring the second generator to an empty state; and
cooling the associated first generator of the first pair to bring it to a charged state.

By repeating the first, second, third and fourth steps to provide substantially continuous operation of the cooling unit can be achieved.

By directing a flow of air over the evaporator such that the air is cooled, a cooling air supply can be provided.

MODE(S) FOR CARRYING OUT THE INVENTION

Figure 1:
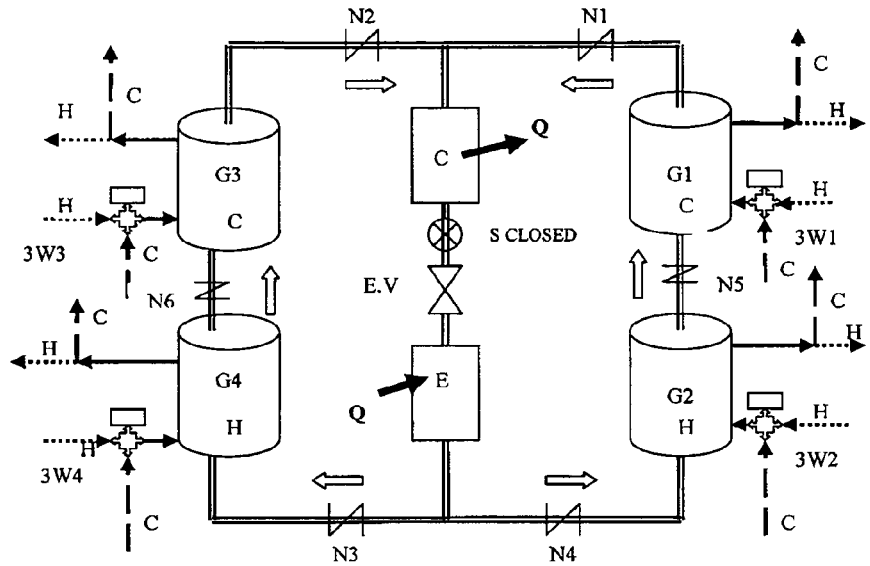
FIGS. 1-8 show the various start-up and operation states of a cooling unit according to an embodiment of the invention.

The aim of this invention is to use 'low' temperature (low grade energy) to generate a cooling effect to the same level that is usually generated by a traditional vapour compression-refrigeration unit with electrical compressor. The invention comprises two stage adsorption refrigeration cycle based on any appropriate adsorbent-refrigerant pair that allows adsorption to occur at high pressure while de-sorption occurs at low pressure. For example, this cycle can be used for activated carbon-methanol, calcium chloride-ammonia, zeolite methanol, or silica gel water adsorbent-refrigerant pairs. The gas cycle of the adsorption unit comprises four generators that can be designed to allow high efficiency for sorption-desorption process at the desired temperatures. Adsorption of refrigerant into the adsorbent can be activated by cooling the generator via a cold water cycle with a regular radiator as heat sink. Any source of hot water can be used, for example from solar collectors or any waste heat source with temperatures as low as 70° C. for the 'high' temperature. A digital controller may also be provided to control hot and cold water circulation pumps and solenoid and three-way valves of the gas cycle.

The cooling unit is new to the invention especially the use of four generators to allow 'low' temperature hot water to produce desorption effect resulting in high cycle efficiency while cooling of the generator to obtain adsorption effect can be obtained at 'high' ambient temperature.

In this description, the terms 'hot' and 'cold' refer to the hottest and coldest temperatures achievable with the particular heating and cooling systems used. For example, in a hot, sunny country, it is possible to obtain hot water by solar heating that can have a temperature in the range 70° C.-90° C. Likewise, cooling using ambient air temperature in such locations can produce 'cold' water having a temperature in the range 30° C.-50° C. The present invention can operate with temperature differences between hot and cold as little as 20° C. although the greater the difference the more efficient the operation.

The cooling unit described below comprises a refrigerant circuit including generators, a compressor and an evaporator. In normal use, the compressor will operate are a relatively high pressure and the evaporator at a relatively low pressure. The remainder of the circuit will operate at a variable pressure depending on matters such as temperature and state of valves connecting to the different parts of the circuit. In this description, 'high pressure' means at or near condenser pressure and 'low pressure' means at or near evaporator pressure. Operations between these limits are described as 'intermediate pressure'.

In the description of operation of the cooling unit, the generators operate with various states of charge of refrigerant adsorbed on the adsorbent. In the description below, the term 'charged' is used to indicate that the amount of refrigerant adsorbed in that generator is at or just below the maximum amount that can normally be adsorbed for the particular operating pressure and temperature. The term 'super-charged' indicates adsorption of amounts of refrigerant above this level. The term 'empty' is used to indicate that only the residual amount of refrigerant is present on the adsorbent following desorption at a particular operating pressure and temperature. The term 'sub-empty' is used to refer to levels of charge below this.

Many types of porous materials have the ability to adsorb (sorb) gases (refrigerants) when cooled and desorb them when heated. For a given low pressure the adsorbent sorbs more refrigerant the lower the temperature (and conversely, lowering the pressure gives the adsorbent less capacity for a given low temperature). Similarly, for a given high pressure, the adsorbent desorbs more refrigerant the higher the temperature (and conversely, raising the pressure gives the adsorbent greater capacity to retain adsorbed refrigerant and so needs higher temperatures to desorb the maximum refrigerant). Previous single stage adsorption cycles are arranged such that all of the desorption occurs at high pressure hence a very high temperature is needed, while all of the adsorption occurs at low pressure hence very low cooling temperature is needed. In the present invention two stages are used so that most of the adsorption is performed at high pressure and desorption occurs at low pressure allowing lower 'hot' water temperatures and high 'low' water temperatures to be used. In this invention, generator pairs are used such that one generator of the pair is super-charged with the refrigerant while the other is totally emptied (activated). The generator that was supercharged is then pressurised by heating it (again at lower hot water temperature than previously needed) and the activated generator is cooled to obtain high vacuum levels at cooling temperature higher than previously needed. The refrigerant is then desorbed from the super-charged generator through the condenser and evaporator to the sub-empty generator, producing the cooling effect at the evaporator in the process.

Figure 2:
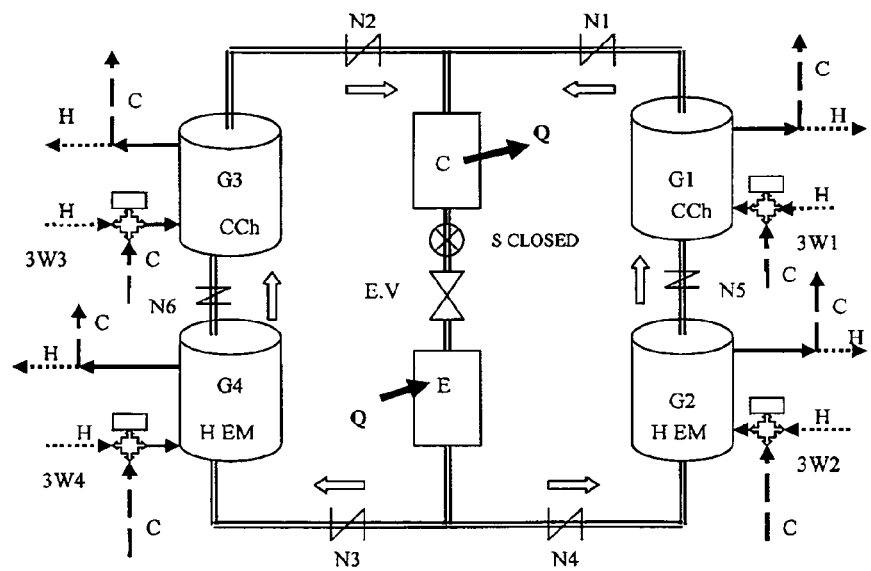
Figure 3:
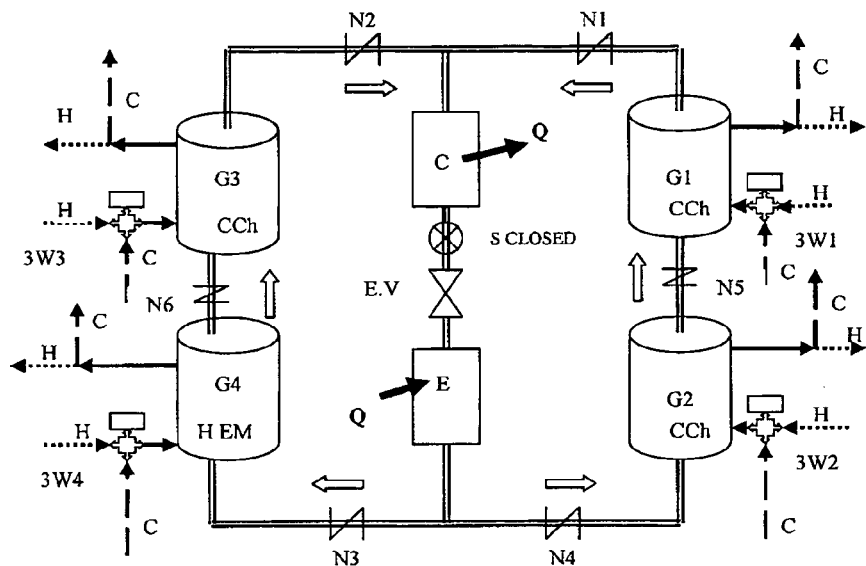
Figure 4:
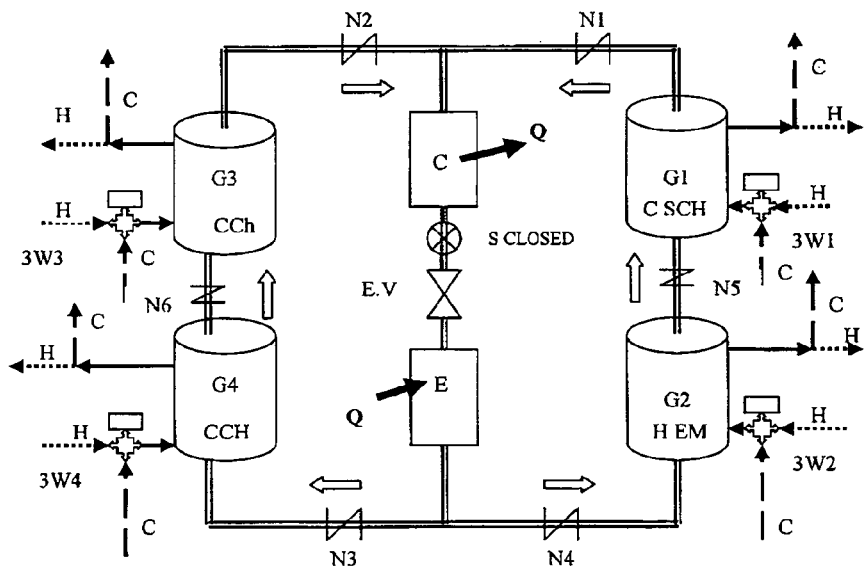
Figure 5:
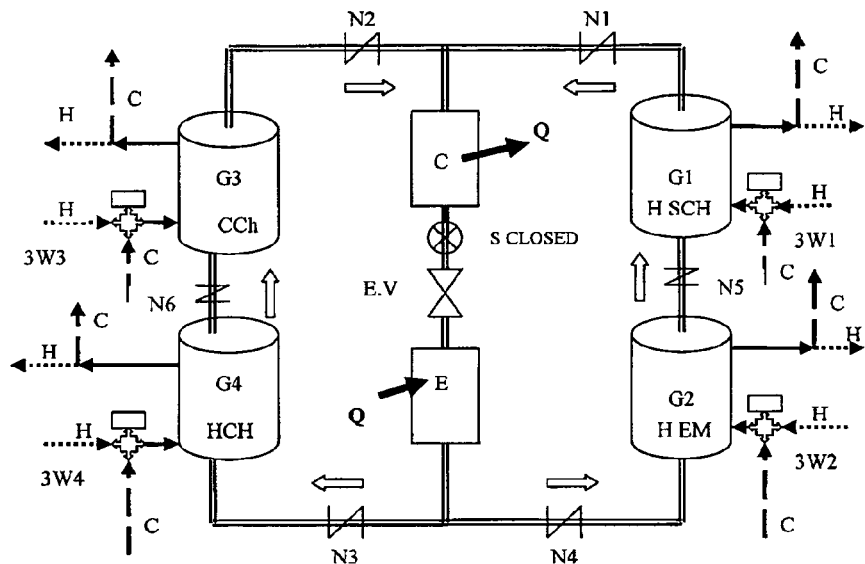
Figure 6:
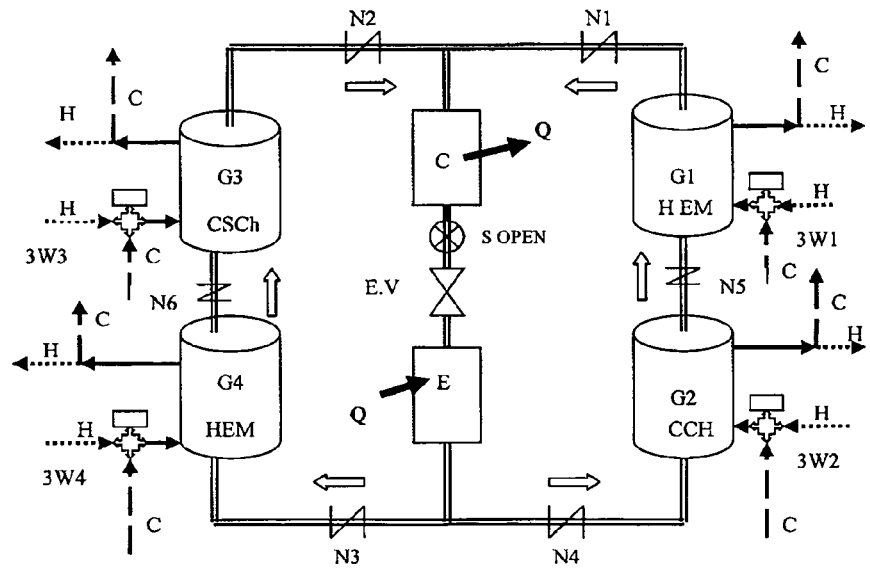
Figure 7:
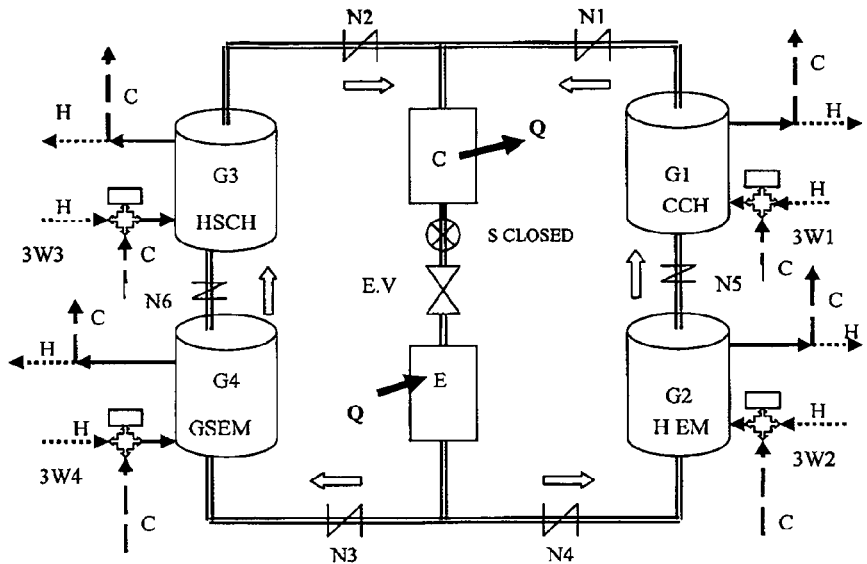
Figure 8:
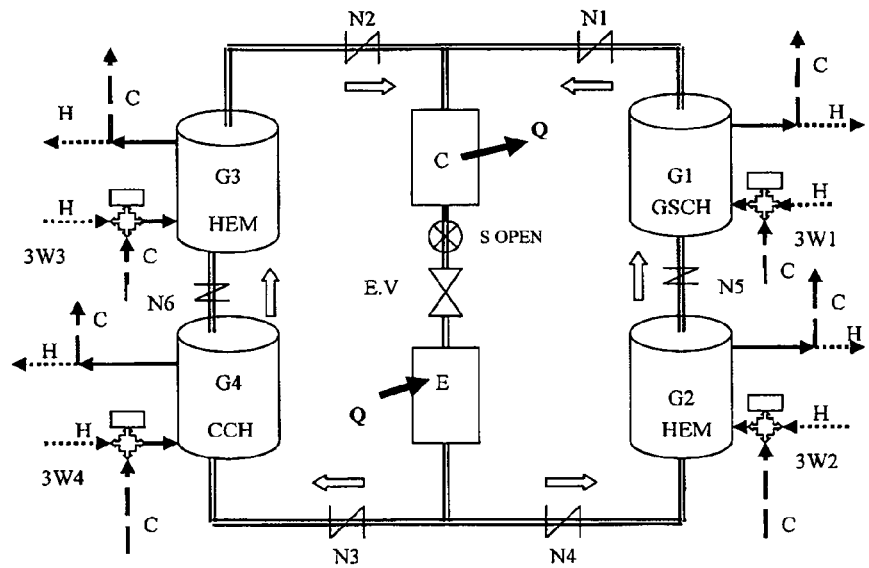
Figure 9:
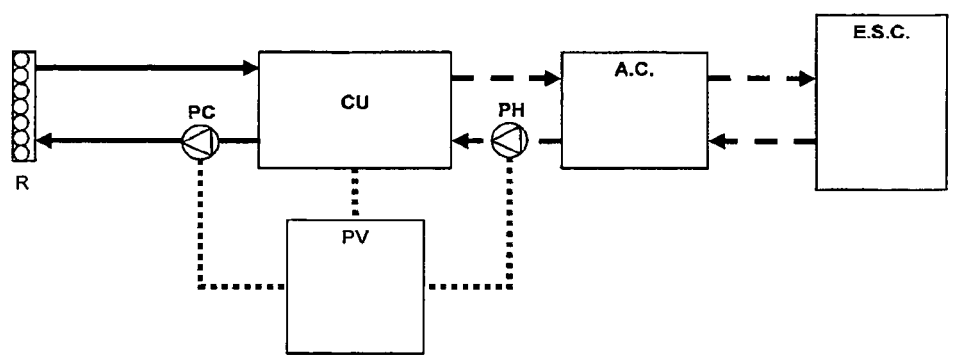
FIG. 9 shows the embodiment of FIG. 1-8 in a full system.

The following abbreviations are used in relation to the accompanying drawings for description of the structure and operation of embodiments of the invention:

E: Evaporator
E.V.: Expansion Valve
E.S.C.: Evacuated Tube Solar Collector
G1, G2, G3, G4: Generators
N1, N2, N3, N4, N5, N6: Non-Return Valves
PC: Cold Water Circulating Pump
PH: Hot Water Circulating Pump
S1: On-off Valve (electrically controlled)
R: Radiator
3W1, 3W2, 3W3, 3W4: three way valves that allow either hot water or cold water to enter the generators
A.C.: Accumulation Chamber The cooling unit according to one embodiment of the invention as shown in FIGS. 1-8, comprises;

four generators connected as two pairs: G1 and G2 on the right hand side of the unit, and G3 and G4 on the left hand side of the unit, each filled with adsorbent, and connected to each other by refrigerant flow lines with non-return valves (N1, N2, N3, N4, N5 and N6) at inlets and outlet of each generator forcing the refrigerant to flow in one direction only as is described below, each generator (G1, G2, G3, G4) having hot and cold water outlets connected to corresponding circulation pumps (PH) and (PC), hot and cold water inlets via three-way valves, and refrigerant inlets and outlets;

a condenser (C) unit connected to a junction coming from two refrigerant flow lines of non-return valves (N1, N2) which are connected to outlets of the generators (G1, G3); secondly connected to first on-off valve (S1) whose flow line extends to an expansion valve (EV);

an evaporator (E) having an inlet end connected to the expansion valve (EV) and an outlet end connected to a junction going to two refrigerant flow lines of non-return valves (N3, N4) which are connected to the inlet ends of the generators (G2, G4); and four three-way valves (3W1, 3W2, 3W3, 3W4) that allow either hot water or cold water to enter the respective generators (G1, G2, G3, G4) via respective connections.

There are effectively two refrigerant circuits formed: generators G1 and G1, and the condenser and evaporator on the right hand side; and generators G3 and G4, and the condenser and evaporator on the left hand side.

To place the cooling unit in a state suitable for operation, it is necessary to being with a start-up sequence. At the beginning of the start-up sequence, the pressure in all parts of the unit is even at an intermediate level (between maximum operating pressure of the condenser and minimum operating pressure of the evaporator), and the refrigerant gas is at ambient temperature. The objective of the start up procedure is to shift the pressure and the temperature in each component of the unit to a starting point for continuous operation. The on-off (solenoid) valve (S) is off in all of the steps of the start up operation, preventing flow from the condenser and evaporator and therefore closing the refrigerant circuit The start-up operation is composed of four steps.

Start-up Step 1—The three way valves 3W1 and 3W3 allow cold water (C) to pass through the generators G1 and G3, while the three way valves 3W2 and 3W4 allow hot water (H) to flow to generators G2 and G4. Consequently, the refrigerant gases will be desorbed from generators G2 and G4 and adsorbed into generators G1 and G2, the cold water flow to G1 and G3 removing any heat of adsorption. This will continue until all gases are transferred from G2 to G1 and from G4 to G3. Refrigerant cannot pass from G4 and G2 to the evaporator E because of the non-return valves N3 and N4. At this point G1 and G3 are cold (C) and charged (Ch), and G2 and G4 are hot (H) and empty (Em) (see FIG. 2).

Start-up Step 2—The three way valves 3W1 and 3W3 allow cold water (C) to pass through the generators G1 and G3 while the three way valve 3W2 allows cold water (C) to flow into G2 cooling it down (and lowering its pressure) to adsorb refrigerant from the evaporator (E) through the non-return valve N4 while the three-way valve (3W4) allows hot water (H) to flow through G4 maintaining the pressure there above evaporator pressure. By the end of this step nearly 50% of the gases in the evaporator will have been adsorbed and its pressure is reduced but not to the minimum level. G1 and G3 remain cold (C) and charged (Ch), G2 also becomes cold (C) and charged (Ch) while G4 remains hot (H) and empty (Em) and at a higher pressure than G2 so refrigerant flow passes only to G2, the higher pressure of G4 preventing refrigerant flow from the evaporator through non-return valve N3 to G4 (see FIG. 3).

Start-up Step 3—The three way valves 3W1 and 3W3 allow cold water (C) to pass through the generators G1 and G3 while the three way valve 3W2 allows hot water (H) to flow into G2 desorbing the gases adsorbed in Step 2 (see above) and raising its pressure. Non-return valve N4 prevents refrigerant flow back into the evaporator and the higher pressure means that the desorbed refrigerant passes through the non-return valve N5 to G1, further increasing the amount of refrigerant therein. At the same time, three way valve 3W4 allows cold water (C) to flow to G4 cooling it down (and lowering its pressure) to adsorb the remainder of the refrigerant in the evaporator E further lowering its pressure. By the end of this step the pressure in the evaporator is at its minimum level, the generator G1 is cold (C) supercharged (SCh) with the refrigerant, G2 is hot (H) and empty (Em) and G3 and G4 are cold (C) and charged (Ch) (see FIG. 4).

Start-up Step 4—The three way valve 3W1 allows hot water (H) to flow to G1 raising its pressure (and the pressure of the condenser). Thus G1 is highly supercharged as the amount of refrigerant significantly exceeds the capacity of the adsorbent at this temperature. At the same time, three way valve 3W2 allows cold water to flow to G2 cooling it down and lowering its pressure to reach to that of the evaporator. Thus G2 has significantly less refrigerant adsorbed than would normally be the case for the residual amount at that temperature and pressure when empty. On the left hand side, three way valve 3W4 allows hot water (H) to flow to G4 (which is charged) heating it up to raise its pressure and desorb the refrigerant from G4 to G3 (which will start to supercharge), and three way valve 3W3 allows cold water (C) to flow to G3 removing the adsorption heat. By the end of this step the conditions of each component of the unit are suitable for commencing the continuous cycle: G1 is hot (H) and super-charged (SCh), G2 is cold (C) and sub-empty (SEm), G3 is cold (C) and partially charged (Ch) and G4 is hot (H) and charged (Ch) (see FIG. 5).

To achieve a substantially continuous cooling effect the cycle is basically composed of three closed loop cycles: a refrigerant cycle, a hot water cycle and a cold water cycle.

The continuous operation for this refrigeration cycle comprises four steps governed by the digital controller. The start of the first operation step is essentially the same as the end of the fourth set-up step but with the solenoid valve S open.

Operation Step 1—At the beginning of this step the generators are in the following states:
G1 is hot and super charged with refrigerant;
G2 is cold and sub-empty (very low level of refrigerant);
G3 is cold and partially charged (low level of refrigerant but higher than the level of G2);
G4 is hot and charged with refrigerant but lower than the level of G1.

In this step the on-off valve (S) is open. The first three way valve 3W1 allows hot water (H) to flow to first generator G1 causing de-sorption to occur at high pressure while second three way valve 3W2 allows cold water (C) to flow to second generator G2 that is initially sub-empty. Since, first generator G1 will be pressurised above the condensation pressure of the refrigerant (for example for methanol above 0.4 bar and for ammonia above 13 bars) due to heat (H), the refrigerant will be desorbed from the adsorbent and flow through the first non return valve N1 to the condenser C. The fifth non-return valve N5 prevents the refrigerant from flowing directly into G2 and the second non-return valve N2 prevents flow into the left hand circuit even though it is at a lower pressure. Consequently, the refrigerant has to pass to the condenser C. In the process the refrigerant condenses in the condenser, then flows through the expansion valve EV, evaporates in the evaporator E at low temperature depending on the level of condensation (up to −5 C can be easily achieved), and is then adsorbed in the second generator (G2).

On the left side of the condenser the three way valve 3W3 allows cold water (C) to G3 while the 3W4 allows hot water (H) to flow to G4 causing the release of refrigerant from G4 at intermediate pressure. The non-return valve N6 allows the refrigerant to flow freely from G4 to G3 where it is adsorbed at the intermediate pressure. During this step G3 will be super-charged with refrigerant since sorption occurs at moderate pressure while G4 is emptied (activated) since de-sorption occurs at the same moderate pressure.

By the end of this step G4 is hot (H) and empty (Em) at intermediate pressure while G3 is cold (C) and super-charged (SCh) at intermediate pressure. G1 is hot (H) and empty (Em) at high pressure and G2 is cold (C) and charged (Ch) at low pressure (see FIG. 6).

Operation Step 2—This is an intermediate step that lasts for a relatively short time compared to Operation Step 1 and aims to prepare generators Operation Step 3 (see below). In Operation Step 2, the on-off valve S is closed to maintain high pressure in the condenser. The three way valve 3W1 allows cold water (C) to flow to G1, lowering its pressure and increasing its capacity to adsorb refrigerant. Non-return valve 3W2 allows hot water (H) to flow to G2 raising its pressure and decreasing its capacity to adsorb refrigerant. Thus the refrigerant that was adsorbed in G2 is desorbed and passes to G1 via non-return valve N5. The discharge of gases from G2 and the absorption of gases at G1 takes place at intermediate pressure. When compared to prior art systems, this intermediate pressure is lower for the discharge step and higher for the absorption step, leading to efficiency gains for a given temperature difference. On the left hand side, non-return valve 3W3 allows hot water (H) to flow to G3 and 3W4 allows cold water (C) to flow to G4. In this step G3 is heated until its pressure increases to condenser pressure leaving it in a greatly super-charged state for its temperature. G4 is cooled until it reaches the evaporator pressure (or lower) leaving it in a sub-empty state for its temperature and pressure. Non-return valves N1, N2 restrain refrigerant to flow from the condenser to generators G1 and G3, and non-return valves N5 and N6 stop refrigerant flow from the G1 to G2 and from G3 to G4 respectively. At the end of this step G3 is at high pressure, hot (H) and super-charged (SCh) and G4 is at low pressure, cold (C) and sub-emptied (SEm). On the other side, G2 is hot (H) and empty (Em) and G1 cold (C) and charged (Ch) at intermediate pressure (see FIG. 7). This state is essentially a mirror image of the state at the end of Start-up Step 4 or the beginning of Operation Step 1.

Operation Step 3—This is essentially the mirror situation of Operation Step 1. Here S is opened to allow for cooling effect and the positions of three way valves are the same as demonstrated in Operation Step 2 (see above). Generator G3, starting in a hot, super-charged state, desorbs refrigerant at high pressure through non-return valve N2 to condenser C and through the expansion valve and evaporator E to be adsorbed in G4 which is cold and initially sub-empty. At the same time refrigerant in G2 continues to be desorbed at high temperature and intermediate pressure and G1 continues to be supercharged and adsorbs the refrigerant from G2 at intermediate pressure and low temperature. This step continues until all refrigerant in G3 passes to G4 causing cooling effect at the evaporator and charging G4, and the entire refrigerant in G2 passes to G1, super-charging it ready for the next step (see FIG. 8).

Operation Step 4—This is an intermediate step similar to Operation Step 2 where solenoid valve S is closed and 3W1 allows hot water to G1 driving it to a hot, super-charged state and 3W2 allows cold water to flow to G2 lowering its temperature and pressure to leave it in a sub-empty state. 3W3 allows cold water to flow to G3 and 3W4 allows hot water to flow to G4 raising its pressure and desorbing refrigerant until it reaches an empty state. 3W3 allows cold water to G3, lowering its pressure and allowing it to adsorb refrigerant desorbed from G4 until it reaches a charged state. At the end of this step the generator conditions reach the conditions mentioned at the end of Start-up Step 4 or the beginning of Operation Step 1 (see FIG. 5).

Solenoid valve S is opened and Operation Steps 1-4 are repeated. As long as there is a supply of hot and cold water and energy to operate the valves, substantially continuous operation can be achieved. By cycling the temperature of the generators and using the non-return valves to prevent back flow, it is possible to obtain two charging steps from G2 and G4 to bring G1 and G3 to a super-charged state before discharge through the condenser and evaporator.

The invention claimed is:

1. A heat-driven adsorption cooling unit, comprising:
   a condenser having an input end and an output end;
   an evaporator having an input end and an output end, the input end being connected to the output end of the condenser via an operable valve; and
   a series of sorption-desorption generators, each of which has an input end and an output end for connection to the condenser and evaporator to create a refrigerant flow circuit, and a heat supply for operating each generator at high and low temperatures, the generators being operable to flow refrigerant through the condenser and evaporator to provide a cooling effect at the evaporator;
   wherein the series of sorption-desorption generators includes two pairs of generators, each pair including:
   a first generator having an output end connected to the input end of the condenser via a first non-return valve arranged to prevent flow from the condenser to the first generator; and
   a second generator having an input end connected to the output end of the evaporator via a second non-return valve arranged to prevent flow from the second generator to the evaporator, and an output end connected to the input end of the first generator via a third non-return valve arranged to prevent flow from the input end of the first generator to the output end of the second generator;
   each pair of generators being separately operable to drive fluid through the condenser and evaporator to provide a cooling effect.

2. A cooling unit as claimed in claim 1, wherein the heat supply comprises a supply of heat transfer fluid to the generators to control a temperature of the generators.

3. A cooling unit as claimed in claim 2, wherein the heat supply comprises a solar heater for heating the heat transfer fluid to a high temperature.

4. A cooling unit as claimed in claim 3, wherein the solar heater comprises an evacuated tube solar collector.

5. A cooling unit as claimed in claim 2, further comprising an accumulator for storing hot heat transfer fluid prior to supply to the generators.

6. A cooling unit as claimed in claim 1, wherein the heat supply comprises a radiator for cooling the heat transfer fluid to a low temperature.

7. A cooling unit as claimed in claim 6, wherein the radiator is cooled by air at ambient temperature.

8. A cooling unit as claimed in claim 1, further comprising pumps for circulating hot or cold heat transfer fluid to the generators.

9. A cooling unit as claimed in claim 2, wherein the heat transfer fluid comprises water.

10. A method of operating a cooling unit comprising:
    a condenser having an input end and an output end;
    an evaporator having an input end and an output end, the input end being connected to the output end of the condenser via an operable valve; and
    two pairs of sorption-desorption generators, each pair including
    a first generator having an output end connected to the input end of the condenser via a first non-return valve arranged to prevent flow from the condenser to the first generator;
    a second generator having an input end connected to the output end of the evaporator via a second non-return valve arranged to prevent flow from the second generator to the evaporator, and an output end connected to the input end of the first generator via a third non-return valve arranged to prevent flow from the input end of the first generator to the output end of the second generator; and
    a heat supply for operating each generator at high and low temperatures, the method comprising:
    operating the valve and the heat supplies to the generators of each pair so as to cycle a temperature in each generator between hot and cold such that refrigerant is driven around the circuit through the condenser and evaporator, the first generator cycling between super-charged, empty and charged states and the second generator correspondingly cycling between sub-empty, charged and empty states.

11. A method as claimed in claim 10, further comprising, prior to temperature cycling, performing a start-up procedure including:

filling the generators, condenser and evaporator with refrigerant at a substantially constant pressure, the generators being held at a low temperature;

operating a valve to prevent refrigerant flow from the condenser to the evaporator;

heating the second generators of each pair to drive refrigerant into the first generators of each pair such that the first generators become charged and the second generators become empty;

cooling the second generators to draw refrigerant from the evaporator to at least partly charge the second generators; and heating one of the second generators to further increase the charge of refrigerant in the first generator to which it is connected.

12. A method as claimed in claim 11, further comprising, in a first step:

cooling the empty second generator of a first pair to bring it to a sub-empty state;

heating the associated first generator of the first pair to bring it to a super-charged state; and allowing refrigerant to pass from the first generator through the condenser and evaporator to the second generator so as to cause a cooling effect at the evaporator.

13. A method as claimed in claim 12, wherein the first step comprises discharging the first generator to an empty state and charging the second generator to a charged state.

14. A method as claimed in claim 12, further comprising, in a second step:

heating the charged second generator of a second pair to discharge refrigerant to the corresponding first generator and bring the second generator to an empty state; and cooling the associated first generator of the second pair to bring it to a charged state.

15. A method as claimed in claim 14, further comprising, in a third step:

cooling the empty second generator of the second pair to bring it to a subempty state;

heating the corresponding charged first generator to bring it to a supercharged state; and allowing refrigerant to pass from the first generator of the second pair through the condenser and evaporator to the second generator of the second pair so as to cause a cooling effect at the evaporator.

16. A method as claimed in claim 15, comprising discharging the first generator to an empty state and charging the second generator to a charged state.

17. A method as claimed in claim 15, further comprising, in a fourth step:

heating the charged second generator of the first pair to discharge refrigerant to the corresponding first generator and bring the second generator to an empty state; and cooling the associated first generator of the first pair to bring it to a charged state.

18. A method as claimed in claim 17, further comprising repeating the first, second, third and fourth steps to provide substantially continuous operation of the cooling unit.

19. A method as claimed in claim 10, further comprising directing a flow of air over the evaporator such that the air is cooled.

* * * * *